Nov. 30, 1971 G. G. CHASE ET AL 3,623,220

METHOD OF MAKING A TUBULAR PRINTED CIRCUIT ARMATURE USING PLATING TECHNIQUES

Filed Jan. 29, 1970

INVENTORS

GORDON G. CHASE

JOHN E. PARKER

BY

Francis A. Sirr

ATTORNEY

United States Patent Office 3,623,220

Patented Nov. 30, 1971

3,623,220

METHOD OF MAKING A TUBULAR PRINTED CIRCUIT ARMATURE USING PLATING TECHNIQUES

Gordon G. Chase, Nederland, and John E. Parker, Longmont, Colo., assignors to International Business Machines Corporation, Armonk, N.Y.

Filed Jan. 29, 1970, Ser. No. 6,816
Int. Cl. H02k *15/02*
U.S. Cl. 29—598 9 Claims

ABSTRACT OF THE DISCLOSURE

A tubular armature, intended for use with an electric motor, is made by plating a first layer of copper onto a stainless steel mandrel, coating the layer of copper with epoxy and fiberglass to form a support cylinder, curing the epoxy, removing spaced portions of the epoxy-glass cylinder in two spaced bands, thus leaving between the bands a mid-portion of the support cylinder which is equal in length to the desired length of the armature, plating a second layer of copper on the support cylinder so as to overlap and make electrical connection to the spaced bands of exposed copper of the first layer, removing the composite cylinder from the mandrel, and photo-etching an armature winding circuit in the inner and outer copper layers such that the crossover portions of the inner and outer winding conductors at each end of the armature are separated by the epoxy-glass cylinder, and such that the interconnections of the individual inner and outer winding conductors are made by copper tabs which extend axially into the spaced bands of overlapped layers of copper.

BACKGROUND AND SUMMARY OF THE INVENTION

The present invention finds utility in the field of electric motors having high accelerating torque, thus requiring an armature with low inertia.

Printed circuit motors generally provide such characteristics. Prior art direct current printed circuit motors generally provide an armature with a continuous multipole wave type winding. The armature winding may consist of two spaced patterns of individual conductor segments, each conductor segment forming one-half turn of a coil of the winding. In a tubular armature, as distinguished from a disk armature, the two spaced patterns take the form of two concentric layers, one inner layer and one outer layer, separated by an insulating layer. In the central portion of the armature, the individual conductor segments are parallel and are aligned generally with the axis of the armature. At each end of the armature, the conductors in the inner and outer layers cross over in opposite directions to advance the winding the required circumferential distance, as determined by the magnetic structure of the motor. At the extreme ends of the armature, the individual conductor segments of one layer are connected to individual segments of the other layer, as by welding, riveting, or by some other step which results in an electrical connection.

The present invention provides an improved armature and method of making the same.

In accordance with the teaching of the present invention, a unique series of steps results in a composite tube or cylinder having inner and outer conductive metal surfaces which are electrically and mechanically joined at spaced annular bands, and are separated therebetween by an insulating and relatively rigid support material in the relatively long annular area between the bands; the length of the area between the bands being approximately equal to the length of the finished armature. Further steps result in an armature winding wherein the crossover portions of the winding are separated by the insulating support material, and wherein the end connections, which connect the inner and outer conductors of the winding, occur at a plurality of tabs formed by utilizing portions of the spaced annular bands of conductive metal.

More specifically, the composite tube is formed of copper and is photo-etched to produce the above-described winding. During the etching process, the major portion of each spaced band of copper is removed, leaving only the connecting tabs which extend generally parallel to the axis of the tube.

DESCRIPTION OF THE PREFERRED EMBODIMENT

The present invention will be described with reference to FIGS. 1 through 6, FIG. 6 of which discloses a tubular armature, for use with an electric motor, which has been made in accordance with the invention hereinafter described. However, the present invention is not to be restricted to the use of the specific structure disclosed in the various figures.

Figure 1:
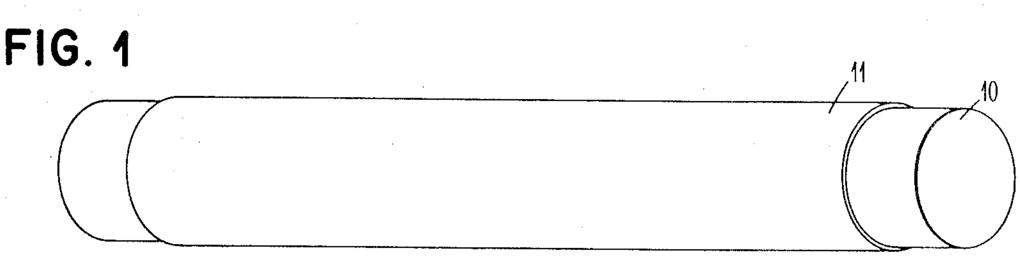
FIGS. 1, 2, 3, and 4 show a mandrel supporting material deposited in accordance with the teaching of the present invention.

In FIG. 1, a stainless steel mandrel 10 has been plated with the desired uniform thickness of copper 11. Prior to plating, the surface of mandrel 10 is cleaned so as not to contaminate the copper. The copper is then plated, as by electroplating, to form a uniform tube or cylinder of copper about the circumference of tube 10 and of an axial length greater than the length of the finished armature. The diameter and concentricity of mandrel 10 are closely controlled. The diameter is made equal to the desired internal diameter of the finished armature.

After copper layer 11 has been plated on mandrel 10, the copper is treated to prepare the outer surface to accept epoxy, as by mechanical roughening or chemical pretreatment.

The composite structure of mandrel 10 and treated copper layer 11 is then encapsulated in the general area of copper layer 11, using epoxy and either a braided glass sleeve or by winding over the copper layer 11 with glass filament. The epoxy is cured to a final cure, preferably under a 150 p.s.i. pressure.

Figure 2:
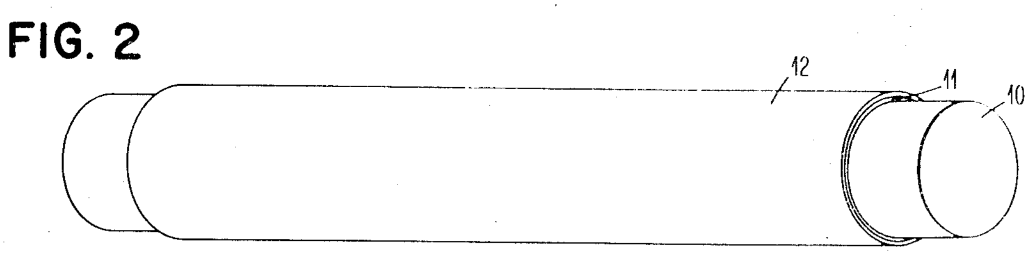

The resulting composite structure, including mandrel 10, copper layer 11, and epoxy-glass layer 12, is then ground on its outer surface to form a concentric epoxy-glass layer of desired wall thickness. FIG. 2 shows this composite structure after grinding.

Prior to the step above defined, it may be desirable to break the copper-epoxy-glass composite cylinder loose from mandrel 10 by pushing the mandrel through a die whose diameter is slightly larger than the diameter of mandrel 10. If this step is utilized, the composite cylinder is not removed from mandrel 10, but is moved axially thereon only ¼ to ½ inch to break the bond of the inner surface of copper layer 11 to the outer surface of mandrel 10.

Figure 3:
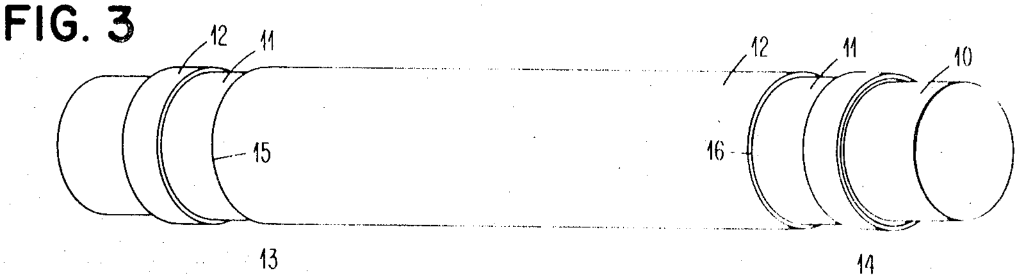

The next step is to remove spaced portions of epoxy-glass layer 12 in two annular spaced bands, the inside edges of which are spaced by a distance approximately equal to the desired length of the finished armature. This step can be performed by using contoured edges of a grinding wheel to remove epoxy-glass layer 12 in two bands 13 and 14 (see FIG. 3) whose inside edges 15 and 16 are spaced approximately the length of the finished armature. As can be seen in FIG. 3, the removing of these portions of the epoxy-glass layer has exposed two annular bands of copper layer 11.

If desired, the outer surface of the epoxy-glass cylinder, between edges 15 and 16, may now be etched in saturated KOH at 180° F. for 30 minutes. More broadly, it may be desirable to prepare the outer surface of the epoxy-glass cylinder to receive the subsequent layer of copper.

Figure 4:
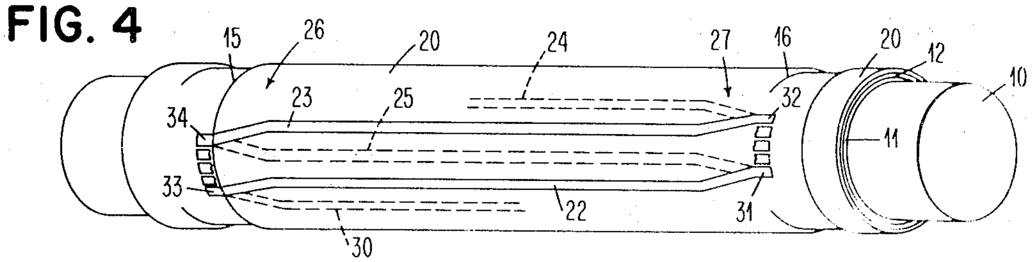
Figure 6:
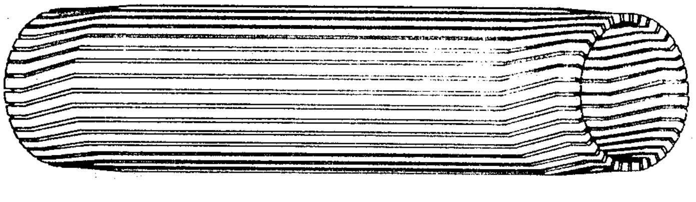
FIG. 6 is a finished tubular armature made in accordance with the teaching of the present invention.

The composite structure as seen in FIG. 3 now receives a second layer of copper 20, FIG. 4. This second layer of copper is deposited by way of plating, for example, electroless immersion plating followed by standard electroplated copper. The length of layer 20 is great enough to cover not only the layer of epoxy-glass between edges 15 and 16, but also covers at least portions of the exposed bands 13 and 14 of copper layer 11. With reference to FIG. 6, a portion of the composite structure of FIG. 4 is broken away and discloses, in partial cross-section, mandrel 10, copper layers 11 and 20, and epoxy-glass layer 12. The two layers of copper 11 and 20 are joined both mechanically and electrically at cylindrical surface 21. Surface 21 consists of a continuous annular band, and such a band is formed at each end of the composite structure, as viewed in FIG. 4.

The composite tube of FIG. 4 is then removed from mandrel 10 by means of a push-off die. This die may be the same die mentioned above in connection with breaking the initial adhesion of the inner surface of copper layer 11 to mandrel 10. Mandrel 10 is reusable to make subsequent armatures.

Figure 5:
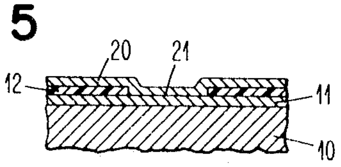
FIG. 5 is a partial section of one of the annular bands of joined copper of FIG. 4.

The resulting composite cylindrical structure now forms a complete copper sheathing 11, 20 which encases the portion of epoxy-glass cylinder 12 between edges 15 and 16. An armature winding is now formed in this copper sheathing. A portion of this winding is represented in FIG. 4. Solid conductors 22 and 23 designate conductors formed in the outer layer of copper 20. Broken lines 24 and 25 designate conductors formed in the inner layer of copper 11. The long central portions of conductors 22–25 extend generally parallel to the axis of the composite tube. At each end of the winding, crossover portions 26 and 27 are provided where the individual conductor segments extend at an angle and spiral around the tube. The conductors on the inside and on the outside of the tube, in crossover portions 26 and 27, spiral in opposite directions, as shown in FIG. 5. Each one of the individual conductor segments 22–25 forms one-half of a turn of the armature winding. In order to form a continuous wave type winding, the right-hand end of outer conductor 22 must advance circumferentially around the armature and must connect to the right-hand end of inner conductor 25. Likewise, the left-hand end of inner conductor 25 must advance in the same circumferential direction and connect to the left-hand end of outer conductor 23. In this manner, a continuous wave type winding advances around the circumference of the tube, completing the winding as inner conductor 30 connects with the left-hand end of outer conductor 22.

A unique feature of the present invention is that the crossover portions 26 and 27 of the armature winding exist only in the area of the composite tube wherein copper layers 11 and 20 are separated by insulating layer 12. As the individual conductor segments of the winding extend axially down the tube, these conductors bend at an angle to circumferentially advance around the tube only in the areas 26 and 27. Before the faces 15 and 16 of insulating layer 12 are reached, the conductors straighten out and, again, extend in a direction substantially axial to the tube, as shown by conductor tabs 31, 32, 33, and 34. It will be noted that conductor tabs 31–34 exist in the area wherein copper layers 11 and 20 mechanically and electrically engage, as at 21, FIG. 5. During the manufacturing process, the excess copper is completely removed in the area of bands 13 and 14, leaving only the portions of these bands which are necessary to interconnect the conductors on the outer surface of the armature with the conductors on the inner surface of the armature.

By way of example, the above-described armature winding structure may be produced by a photo-etching process in which the circuit is formed in the inner and outer surface of the copper sheathing. The artwork is designed such that the copper etches completely through on the outside axially-spaced edges of the interconnecting bands 13 and 14, thus, leaving the completed armature winding after etching with only the interconnecting tabs 31–34 remaining of the copper bands in the portions 13 and 14.

FIG. 6 shows a finished tubular armature produced in accordance with the method above described. Commutation may take place at either end of the straight portion of the individual conductor, or in the area of cross-over of the conductor.

Such an armature is superior in that the concentricity of the armature and the wall thickness of all layers of the armature can be closely controlled; for example, by electroforming and grinding the respective layers. The unique method of forming the interconnections of the inner and outer armature conductors eliminates relatively difficult and expensive interconnection manufacturing steps, as by riveting or welding. Furthermore, since the unused portions of the copper in the area of bands 13 and 14 is removed during the etching process, no separate cut-off operation is necessary.

While the invention has been particularly shown and described with reference to a preferred embodiment thereof, it will be understood by those skilled in the art that various changes in form and details may be made therein without departing from the spirit and scope of the invention.

What is claimed is:

1. The method of making a tubular armature for use with an electric motor, the armature having a winding, including individual conductors which cross over each other, while being insulated from each other, and then extend to end portions where the conductors connect one to another, comprising the steps of:

depositing a first tubular layer of electrically conductive metal on the outer surface of a cylindrical mandrel;

covering only the central portion of the outer surface of said first tubular layer with a tubular layer of electrically insulating and relatively rigid support material;

depositing a second tubular layer of electrically conductive metal of desired thickness on the outer surface of said tubular layer of support material and on the exposed outer surface of said first tubular layer;

removing the composite tube from said cylindrical mandrel; and forming said armature winding on said first and second tubular layers such that the crossover of the individual conductors of said winding occurs only in the portion of said composite tube which includes said support material, and such that the individual conductors which are to be electrically connected extend generally axially into the end portions of said composite tube which include only said first and second tubular layers.

2. The method of making a tubular armature as defined in claim 1, wherein the step of forming said armature winding on said first and second tubular layers is performed by utilizing a printed circuit technique.

3. The method of making a tubular armature as defined in claim 2, wherein said printed circuit technique is a photo-exposure technique, and including the step of removing the metal from said first and second tubular layers which is not to be utilized in said armature winding by an etching technique.

4. The method of making a tubular armature as defined in claim 1, including the step of preparing the outer surface of said first tubular layer to receive said insulating material prior to the step of covering the outer surface of said first tubular layer with said insulating material.

5. The method of making a tubular armature as defined in claim 1, wherein the step of covering the central portion of the outer surface of said first tubular layer with a tubular layer of support material includes the steps of:

covering substantially the complete length of said first tubular layer with said support material, and removing spaced radial bands of said support material to expose the outer surface of said first tubular layer.

6. The method of making a tubular armature as defined in claim 1, wherein the step of forming said armature winding on said first and second tubular layers utilizes printed circuit techniques to produce a continuous wave type winding with the individual winding conductors in the first tubular layer and the individual winding conductors in the second tubular layer crossing over to advance in opposite circumferential direction in the end portions of said composite plated tube and then extend generally parallel with the axis of said tube into the extreme ends of said tube where the individual conductors connect by virtue of said second tubular layer being deposited on the outer surface of said first tubular layer.

7. The method of making a tubular armature as defined in claim 4, wherein said first tubular layer is a layer of copper deposited on a stainless steel mandrel by utilizing a plating technique, wherein said support material is an epoxy-glass layer, wherein said epoxy-glass layer is first cured and its outer surface is then ground to a desired thickness, and wherein said second tubular layer is a layer of copper deposited by utilizing a plating technique.

8. The method of making a tubular armature as defined in claim 7, wherein the step of forming said armature winding on said first and second copper layers is a photo-etching step, the photo-etching artwork being designed such that the copper etches completely through the outside edges of the interconnected layers of copper to produce a completed armature after etching.

9. A tubular armature for use with an electric motor made in accordance with the method defined in claim 1.

References Cited

UNITED STATES PATENTS 3,059,323 10/1962 Moressee et al. ------- 29—598

CHARLIE T. MOON, Primary Examiner

C. E. HALL, Assistant Examiner

U.S. Cl. X.R.

29—527.2, 624, 625; 310—261, 264, 266